(No Model.)
W. M. DAWSON & R. A. SIMPSON.
WHIFFLETREE PLATE.
No. 281,032. Patented July 10, 1883.
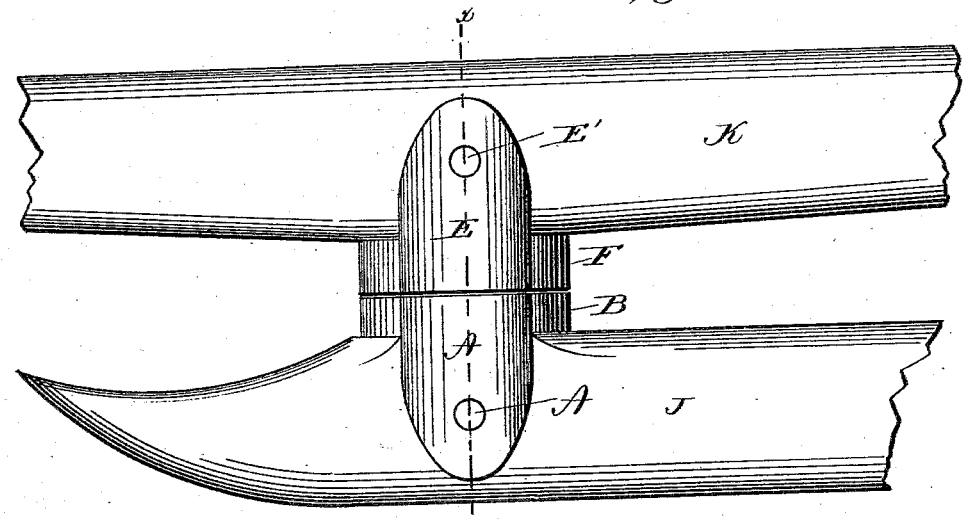
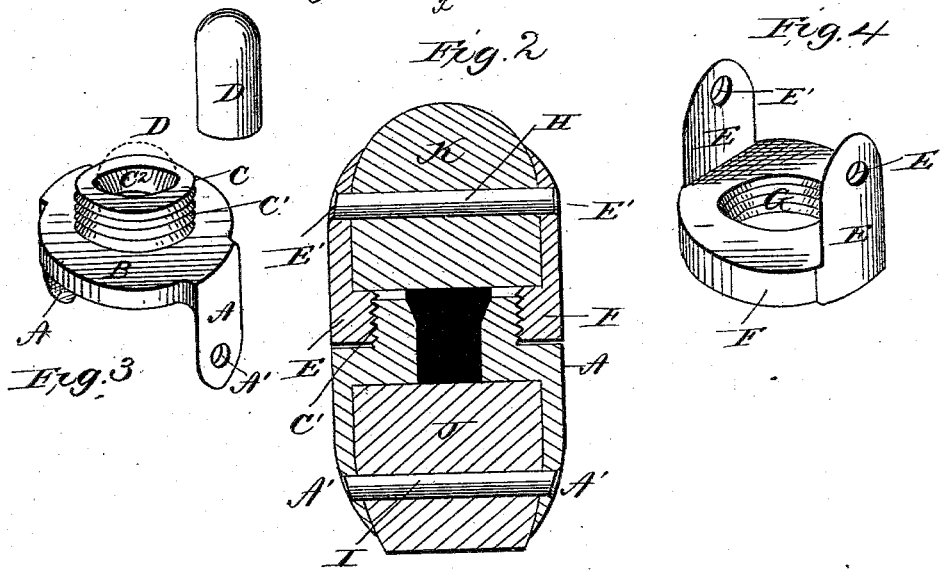
WITNESSES
F. L. Ourand
W. W. Wood
William M. Dawson
Robert A. Simpson
INVENTORS
Frank A. Fouts
Attorney

UNITED STATES PATENT OFFICE.

WILLIAM M. DAWSON AND ROBERT A. SIMPSON, OF BELVIDERE, ILLINOIS.

WHIFFLETREE-PLATE.

SPECIFICATION forming part of Letters Patent No. 281,032, dated July 10, 1883.

Application filed April 13, 1883. (No model.)

*To all whom it may concern:*

Be it known that we, WM. M. DAWSON and R. A. SIMPSON, citizens of the United States, residing at Belvidere, in the county of Boone and State of Illinois, have invented certain new and useful Improvements in Whiffletree Plates or Couplings, of which the following is a specification, reference being had therein to the accompanying drawings.

Our invention relates to a whiffletree plate or coupling; and it consists in the parts which will be hereinafter described, and pointed out in the claims.

In the accompanying drawings, Figure 1 is a front view of a vehicle-bolster and whiffletree provided with our improvement. Fig. 2 is a cross-section on the line $xx$ of Fig. 1. Fig. 3 is a perspective view of the bolster-plate, and Fig. 4 is a perspective view of the whiffletree-plate. Fig. 5 is a view of a rubber spring.

Like letters indicate like parts throughout the several views.

A represents the lugs or lips on the bolster-plate, and A' openings in the said lugs.

C is a hollow plug projecting upward from the center of the plate B. Said plate and plug have a countersunk opening, $C^2$, through them, and the plug has an outside thread, C'.

D is a rubber spring, which fits into the opening $C^2$ to prevent the rattling of the parts when united.

E are lugs on whiffletree-plate F. E' are openings in said lugs.

G is a threaded opening in the plate F.

H is a bolt or rivet, which passes through the openings E' in lugs E and through the whiffletree K. I is also a bolt or rivet, which passes through A' and bolster J.

The device is applied and operated as follows: The plates B F, being secured to the bolster and whiffletree, respectively, in the manner shown, the thread G of the plate F is screwed onto thread C' of the bolster-plate, whereby said threads take the place of bolts through the bolster and whiffletree. Before uniting the plates the rubber D should be inserted into the opening $C^2$, and when the thread G is screwed onto thread C' said rubber presses against the bolster J and the whiffletree K, thereby preventing the rattling of the several parts. We do not confine our spring to rubber, as a spiral or other form may be employed without departing from the principle of our invention, and we may use other form of thread without departing from the spirit of our improvement.

One of the principal advantages derived by the use of our invention is that the whiffletree or evener vibrates by working on the threads instead of on the plates.

Having thus described our invention, we claim as new and desire to secure by Letters Patent—

1. In a whiffletree plate or coupling, an upper and lower plate united by screw-plug and threaded socket, as set forth, whereby the vibratory movement of the parts is on the threads, in combination with a spring adapted to fit into the plate-socket, whereby rattling of the parts is prevented, substantially as specified.

2. The plate F, provided with threaded opening G and lugs E E, and the plate B, provided with threaded plug C, in combination with the spring D, the parts being arranged and operated in the manner specified.

In testimony whereof we affix our signatures in presence of two witnesses.

WILLIAM M. DAWSON.
ROBERT A. SIMPSON.

Witnesses:
W. W. WOOD,
C. B. LOOP.